(12) United States Patent
Woodrum

(10) Patent No.: US 11,503,767 B2
(45) Date of Patent: Nov. 22, 2022

(54) ADJUSTABLE SEAT ASSEMBLY FOR A LAWN MAINTENANCE VEHICLE

(71) Applicant: MTD PRODUCTS INC, Valley City, OH (US)

(72) Inventor: Adam Woodrum, Wakeman, OH (US)

(73) Assignee: MTD PRODUCTS INC, Valley City, OH (US)

( * ) Notice: Subject to any disclaimer, the term of this patent is extended or adjusted under 35 U.S.C. 154(b) by 460 days.

(21) Appl. No.: 16/655,302

(22) Filed: Oct. 17, 2019

(65) Prior Publication Data
US 2020/0120871 A1    Apr. 23, 2020

Related U.S. Application Data

(60) Provisional application No. 62/746,629, filed on Oct. 17, 2018.

(51) Int. Cl.
| | |
|---|---|
| *A01D 67/04* | (2006.01) |
| *A01D 34/00* | (2006.01) |
| *A01D 34/64* | (2006.01) |
| *B60N 2/38* | (2006.01) |
| *A01D 101/00* | (2006.01) |

(52) U.S. Cl.
CPC .......... *A01D 67/04* (2013.01); *A01D 34/006* (2013.01); *A01D 34/64* (2013.01); *B60N 2/38* (2013.01); *A01D 2101/00* (2013.01)

(58) Field of Classification Search
CPC ...... A01D 67/04; A01D 34/006; A01D 34/64; A01D 2101/00; B60N 2/38
See application file for complete search history.

(56) References Cited

U.S. PATENT DOCUMENTS

| | | | |
|---|---|---|---|
| 3,741,511 A | 6/1973 | Streeter | |
| 5,857,535 A * | 1/1999 | Brooks | ..................... B60N 2/39 180/41 |
| 6,026,920 A * | 2/2000 | Obeda | .................. B60G 21/007 180/41 |
| 7,614,699 B2 * | 11/2009 | Torres | ...................... B60N 2/39 297/344.14 |

(Continued)

FOREIGN PATENT DOCUMENTS

| | | |
|---|---|---|
| DE | 10252204 | 2/2004 |
| JP | H06 33785 | 5/1994 |

(Continued)

OTHER PUBLICATIONS

International Search Report and Written Opinion for International Application No. PCT/US2019/056636 dated Jan. 28, 2020, 13 pages long.

*Primary Examiner* — Toan C To
(74) *Attorney, Agent, or Firm* — Wegman Hessler

(57) ABSTRACT

A lawn maintenance vehicle includes an adjustable seat assembly, wherein the seat assembly is rotatable relative to a frame of the vehicle when the vehicle is operated on a sloped surface. The seat assembly is rotatable in order to maintain the operator in a substantially vertical seated alignment while operating the vehicle on a sloped surface. The seat assembly is also rotatable when the vehicle is in a zero-turn or tight-turn maneuver, wherein the seat is rotated toward the center of turning radius to offset the centrifugal forces experienced by the operator during such a maneuver.

33 Claims, 16 Drawing Sheets

(56) References Cited

U.S. PATENT DOCUMENTS

| | | | | |
|---|---|---|---|---|
| 9,538,706 | B2 | 1/2017 | Haun | |
| 9,758,073 | B2* | 9/2017 | Knox | B60N 2/10 |
| 9,783,086 | B2* | 10/2017 | Parker | A01D 34/86 |
| 9,902,300 | B2* | 2/2018 | Hein | B60N 2/10 |
| 9,944,206 | B2* | 4/2018 | Knox | B60N 2/10 |
| 10,029,571 | B2* | 7/2018 | Ito | G01C 19/5776 |
| 10,821,859 | B2* | 11/2020 | Parker | B60N 2/1878 |
| 10,890,165 | B2* | 1/2021 | Heathcoat | B62D 3/14 |
| 2012/0161485 | A1* | 6/2012 | Stockwell | B60N 2/39 |
| | | | | 297/344.11 |
| 2013/0131923 | A1* | 5/2013 | Tzipman | B60N 2/39 |
| | | | | 280/124.103 |
| 2014/0110182 | A1* | 4/2014 | Dwyer | A01D 34/824 |
| | | | | 74/522 |
| 2017/0190270 | A1* | 7/2017 | Busboom | B60N 2/502 |
| 2017/0203673 | A1 | 7/2017 | Parker et al. | |
| 2019/0075723 | A1* | 3/2019 | Spitz | A01D 34/71 |

FOREIGN PATENT DOCUMENTS

| | | |
|---|---|---|
| JP | 3425197 | 7/2003 |
| KR | 20120022150 | 3/2012 |

* cited by examiner

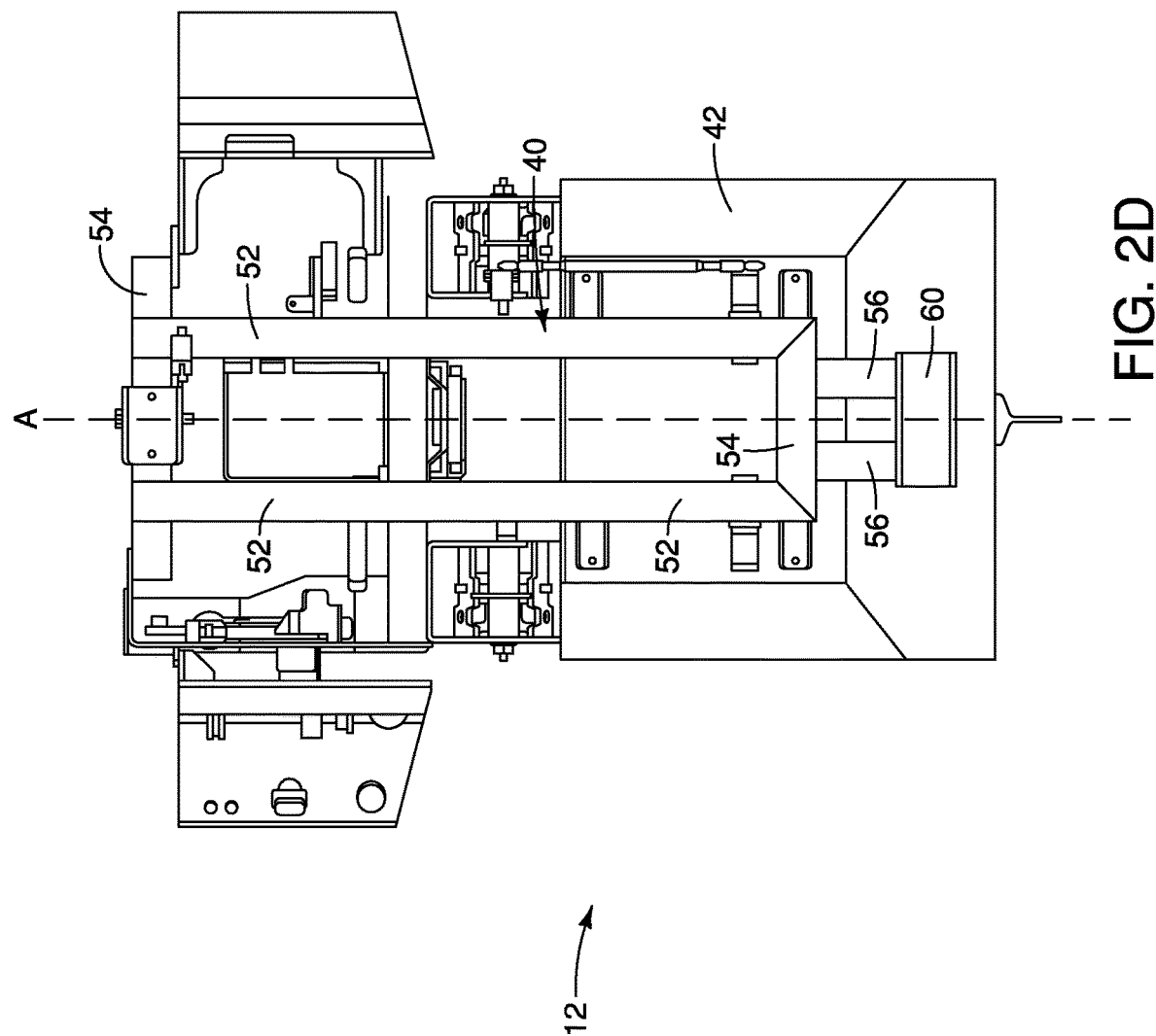

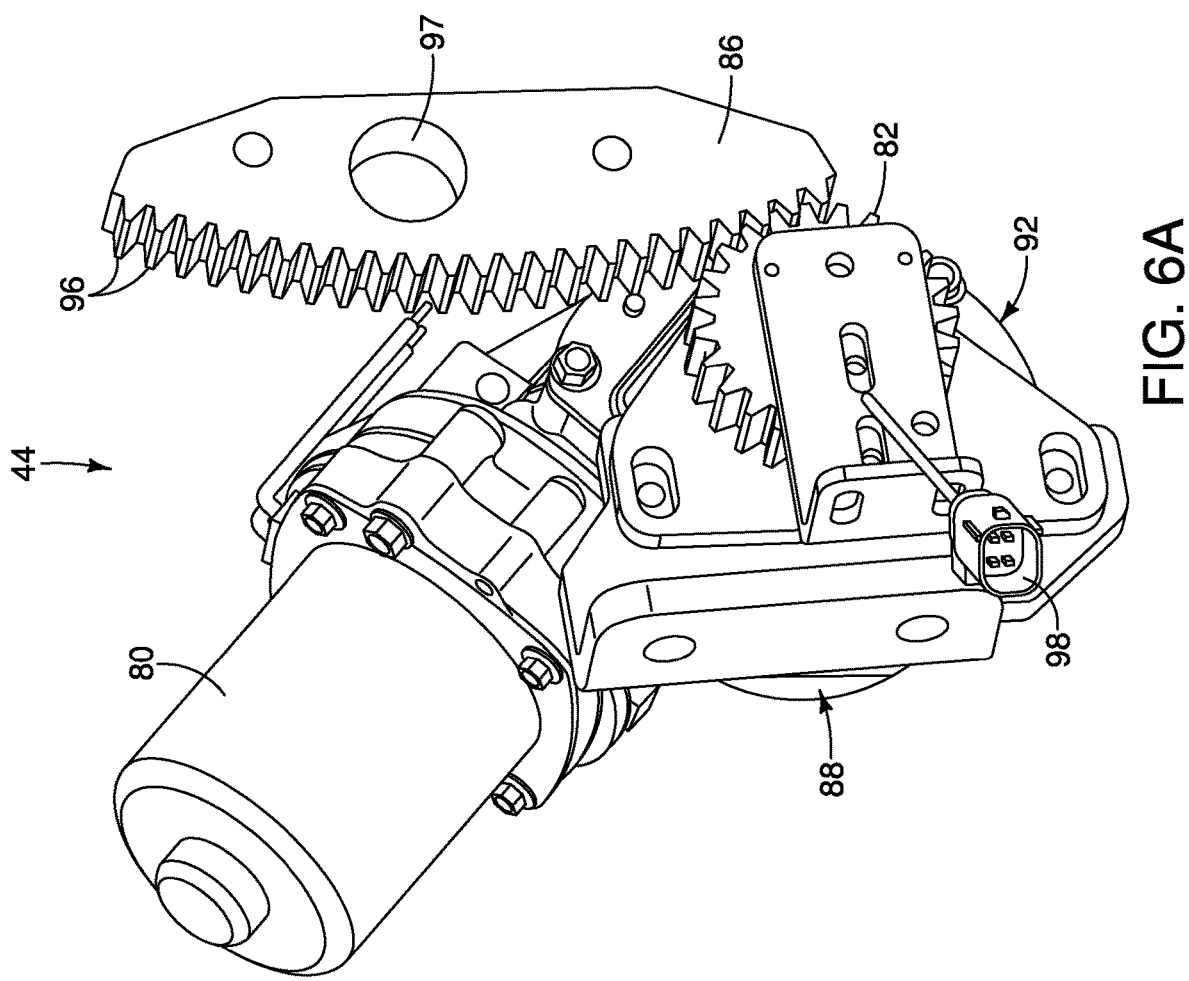

ADJUSTABLE SEAT ASSEMBLY FOR A LAWN MAINTENANCE VEHICLE

CROSS-REFERENCE TO RELATED APPLICATIONS

This application claims priority to U.S. Provisional Patent Application Ser. No. 62/746,629 filed Oct. 17, 2018, and entitled ADJUSTABLE SEAT ASSEMBLY FOR A LAWN MAINTENANCE VEHICLE, which is herein incorporated by reference in its entirety.

FIELD OF THE INVENTION

The present invention relates to lawn maintenance vehicles, and more particularly, to riding lawn mowers or riding lawn tractors.

BACKGROUND OF THE INVENTION

Mowing grass or vegetation on the side of hills, culverts, or other sloped surfaces is generally very difficult on most riding lawn vehicles such as lawn mowers or lawn tractors. Generally, the operator's seat is bolted or otherwise securely attached to the frame of the mower/tractor such that when the operator is mowing grass or other vegetation on a sloped surface, the operator typically leans or otherwise adjusts his/her body in the up-slope direction in order to stay somewhat upright or perpendicularly aligned to a horizontal plane. Over an extended time, such contortion of the body often causes pain, stress, and tiredness to the operator.

Further, when operating a zero-turn radius (or tight-turn radius) lawn maintenance vehicle having a seat substantially fixed to the frame, centrifugal forces cause the operator to lean radially outward away from the axis about which the lawn maintenance vehicle is turning. This causes the operator to sometimes fight to stay seated or to maintain control of the steering mechanism during such a tight turn.

BRIEF SUMMARY OF THE INVENTION

A need therefore exists to provide a lawn maintenance vehicle having a seat that is adjustable so as to maintain the operator in a substantially vertical orientation relative to a horizontal plane. A need therefore also exists to provide a lawn maintenance vehicle having a seat that offsets the centrifugal forces during a tight-turn maneuver so as to allow the operator to maintain control of the vehicle while reducing or eliminating the chance of sliding out of the seat during a tight-turn maneuver.

In one aspect of the present invention, a lawn maintenance vehicle is provided. The lawn maintenance vehicle includes a frame having a front end and a rear end. A plurality of ground engaging members are operatively connected to the frame. A power source for driving at least one of the ground engaging members. A steering assembly is operatively connected to at least one of the ground engaging members. A seat is assembly rotatably connected to the frame. A control assembly is operatively connected to the seat assembly. An adjustment mechanism is attached to the seat assembly and the frame for rotating the seat assembly relative to the frame.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 2D is a bottom view of the seat assembly shown in FIG. 2A;

FIG. 6A is a perspective view of an adjustment mechanism;

Figure 1:
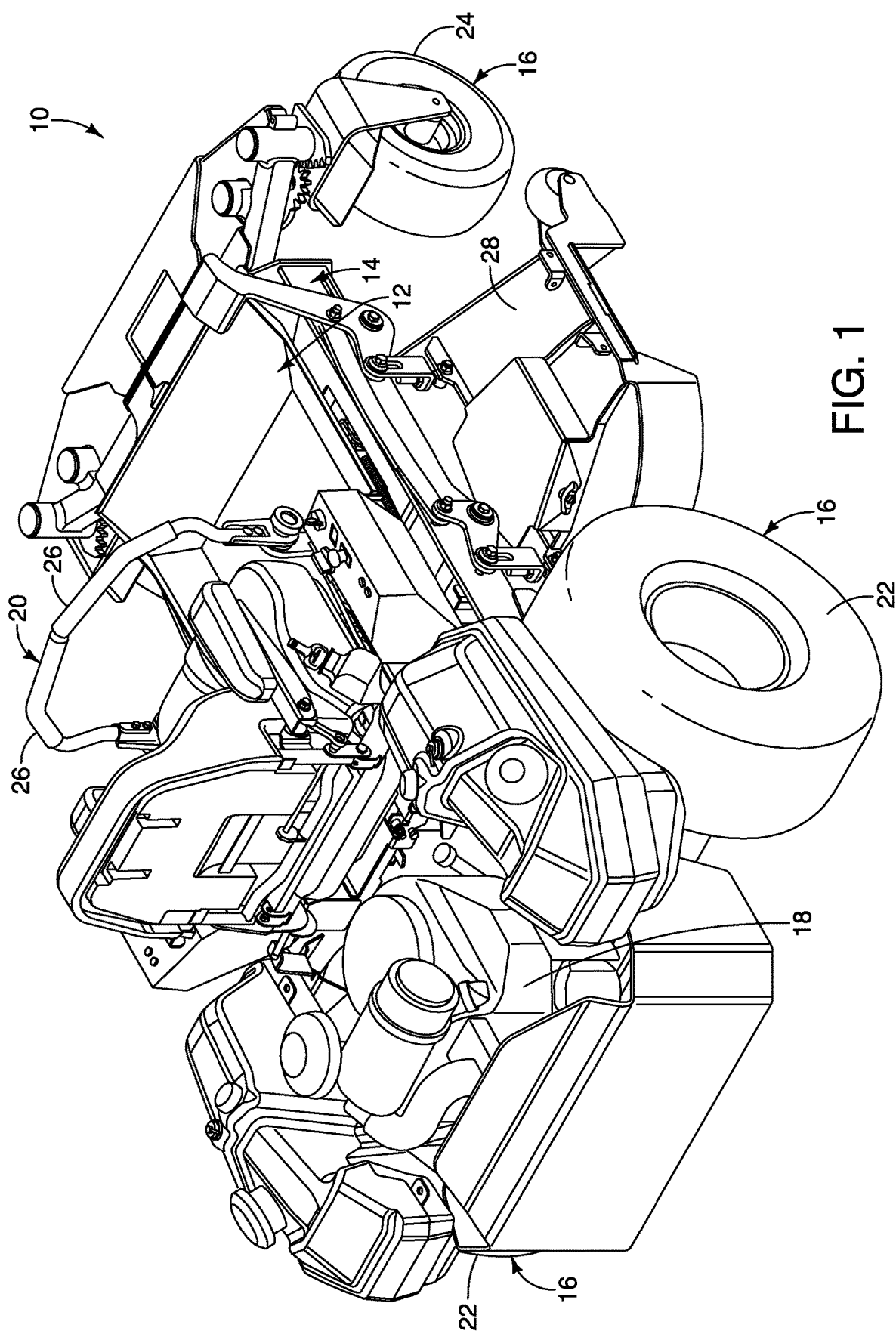
FIG. 1 is a perspective view of an embodiment of a lawn maintenance vehicle.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Referring to FIG. 1, an exemplary embodiment of a riding lawn maintenance vehicle 10 having an adjustable seat assembly 12 is shown. The lawn maintenance vehicle 10 can be a riding lawn mower, a riding lawn tractor, or a stand-on lawn mower, but it should be understood by one having ordinary skill in the art that other riding maintenance vehicles are included within the scope of the lawn maintenance vehicle 10. In an embodiment, the adjustable seat assembly 12 is self-adjustable. In other embodiments, the adjustable seat assembly 12 is manually adjustable. In a further embodiment, the seat assembly 12 allows for both self-adjustment as well as manual adjustment thereof. The adjustable seat assembly 12 is configured to normalize the forces on the operator. In some embodiments, the seat assembly 12 is adjustable to normalize the forces in the X-direction (fore/aft) or Y-direction (lateral) on the operator. In other embodiments, the seat assembly is adjustable to normalize the forces in the X- and Y-directions (fore/aft and lateral) on the operator. In further embodiments, the seat assembly is adjustable to normalize the forces in the X-, Y-, and Z-directions (fore/aft, lateral, and vertical) on the operator. Because the center of gravity of the seat assembly (in combination with the operator) is positioned above the axis of rotation A, the adjustable seat assembly 12 is also configured to improving the stability of the vehicle and the operator by moving the center of gravity in the direction opposite the direction of forces acting on the operating as a result of a zero-turn or tight turning maneuver or driving the vehicle on a sloped surface.

As shown in the exemplary embodiment of FIG. 1, the vehicle 10 includes a frame 14, the self-adjusting seat assembly 12 operatively connected to the frame 14, a plurality of ground engaging members 16 operatively connected to the frame 14, a transmission assembly (not shown) operatively connected to at least one of the ground engaging members 16, a power source 18 for driving the transmission assembly, and a user-controlled steering assembly 20 for controlling movement of the vehicle 10. The frame 14 provides the structural support system for the vehicle 10, wherein the various components and assemblies are directly or indirectly attached thereto. The seat assembly 12 is rotatably connected to the frame 14, and the operator must be seated on the seat assembly 12 in order to operate the vehicle 10. The frame 14 includes a front end and a rear end, wherein the front end of the frame 14 is the end that is directed forwardly as the vehicle 10 moves forwardly, and the rear end of the frame 14 is the opposing trailing end.

In the illustrated embodiment, the vehicle 10 includes a plurality of ground engaging member 16 which includes a pair of rear wheels 22 and a pair of front wheels 24, as shown in FIG. 1. The rear wheels 22 are driven or otherwise rotated by the transmission assembly (not shown). In an embodiment, the front wheels 24 are formed as free-wheeling caster wheels or tires. In another embodiment, the front wheels 24 are formed as steerable wheels or tires. In a further embodiment, the front wheels 24 are formed as driven wheels. Although the illustrated vehicle 10 is shown as having a pair of rear wheels 22 and a pair of front wheels 24, it should be understood by one having ordinary skill in the art that the vehicle 10 can include any number of rear wheels 22 as well as any number of front wheels 24 in which the wheels 22, 24 are configured to contact the ground and guide the direction of the vehicle 10.

As shown in FIG. 1, the power source 18 is an internal combustion engine that is operatively connected to the frame 14 and the transmission assembly (not shown). In other embodiments, the power source 18 includes at least one rechargeable battery. In further embodiments, the power source 18 is a hybrid power source which can include an internal combustion engine as well as at least one rechargeable battery or other combination of components capable of providing output power. The power source 18 is configured to provide output power to the transmission assembly, wherein the transmission assembly is configured to drive or otherwise selectively control the movement of at least one of the ground engaging members 16 in response to user input through the steering assembly 20. It should be understood by one having ordinary skill in the art that the power source 18 can be formed in any configuration so as to provide output power to a transmission assembly for controlling movement of at least one of the ground engaging members 16. In vehicles 10 formed as mowers, the power source 18 further provides power to at least one spindle (not shown) that drives a cutting blade or the like.

The transmission assembly (not shown) is configured to selectively control the forward and reverse movement of the vehicle 10 by selectively driving and/or turning at least one ground engaging member 16. In some embodiments, the transmission assembly is also configured to selectively control the relative direction of the vehicle 10 by rotationally driving at least one of the ground engaging members 16 at a different rotational velocity than another of the ground engaging members 16. The transmission assembly generates output power to drive or otherwise cause at least one of the ground engaging members 16 to rotate in the forward/reverse direction and/or turn laterally. In the illustrated embodiment, the transmission assembly is configured to control the rotation of both rear wheels 22. In other embodiments, the transmission assembly is configured to control the rotation of at least one rear wheel 22. In further embodiments, the transmission assembly is configured to control the forward/reverse rotation of at least one rear wheel 22 and laterally turn at least one front wheel 24. The transmission assembly can be formed as a mechanical transmission assembly, a hydraulic assembly, a plurality of electric motors in which one of the motors is attached to each driven ground engaging member 16, any combination thereof, or any other system or assembly configured to control the rotation and/or direction of at least one ground engaging member 16. In an embodiment, the transmission assembly selectively controls only the forward/reverse rotation of at least one ground engaging member 16 relative to the ground. For example, in the illustrated embodiment, the transmission assembly selectively controls the forward/reverse rotation of a pair of rear wheels 22 relative to the ground, wherein the relative rotation of the pair of rear wheels 22 relative to the ground also determines the overall direction of the vehicle 10. In another embodiment, the transmission assembly selectively controls both the relative rotation of at least one ground engaging member 16 relative to the ground as well as selectively controls the direction or orientation of at least one ground engaging member 16. It should be understood by one having ordinary skill in the art that the transmission assembly can be configured in any manner to selectively control any number of ground engaging members 16 so as to selectively control the overall direction of the vehicle 10.

The transmission assembly is operatively connected to the steering assembly 20, wherein the steering assembly 20 is configured to receive user input and generate an output to control the transmission assembly and the steerable ground engaging member 16 to guide the movement and direction of the vehicle 10. The steering assembly 20 includes at least one user-controller steering member 26 for selectively controlling the overall direction of the vehicle 10. In the illustrated embodiment shown in FIG. 1, the steering assembly 20 includes a pair of steering members 26 formed as lap bars, wherein each lap bar is selectively movable in the fore/aft direction to control the rotational direction and speed of rotation of a rear wheel 22. In another embodiment, the steering member 26 is a steering wheel, wherein selective rotation of the steering wheel causes the ground engaging member(s) 16 to change the fore/aft movement and direction of the vehicle 10. In a further embodiment, the steering member 26 is a joystick, wherein the joystick allows the operator to change the movement and direction of the vehicle 10. It should be understood by one having ordinary skill in the art that the steering member 26 can be configured as any component or assembly that is sufficient to allow the operator to change the movement and direction (sometimes with assistance of an accelerator and/or brake pedals) of the vehicle 10. In an embodiment, the steering assembly 20 is separate from the seat assembly 12. In another embodiment, the steering assembly 20 is connected to the seat assembly 12 and is rotatable when the seat assembly 12 rotates relative to the frame 14.

As shown in embodiment illustrated in FIG. 1, the vehicle 10 further includes a cutting deck 28 operatively connected to the frame 14. The cutting deck 28 includes at least one cutting blade (not shown) that is rotatable within the cutting deck 28 for cutting grass. The height of the cutting deck 28 relative to the ground is adjustable. The rotatable blade(s) within the cutting deck 28 are driven by the power source 18.

In an exemplary embodiment, the seat assembly 12 includes a base 40, a platform 42 attached to the base 40, and a seat 46 attached to the base 40, as shown in FIGS. 2A-3B. In the illustrated embodiment, the seat assembly 12 includes a pair of operator control panels 70 connected to the base 40. In another embodiment, the operator control panel(s) 70 are connected to the frame 14 and are separate from the seat assembly 12. The base 40 is configured as the structural support for the seat assembly 12. The base 40 provides two (2) rotatable connections with the frame 14 that allow the seat assembly 12 to rotate relative to the frame 14. The pair of rotatable connections between the base 40 and the frame 14 form an axis of rotation A for the seat assembly 12.

In the illustrated embodiment, the base 40 includes a front pair of parallel, spaced-apart longitudinal tubes 52 and a rear pair of tubes 52 oriented substantially parallel to the axis of rotation A of the seat assembly 12. The front and rear pair of tubes 52 are connected by way of a pair of vertically-aligned transition tubes 53 extending upwardly from the pair of the front pair of tubes 52 and a transition cross-tube 54 extending between the front ends of the front pair of tubes 52 as well as between the rear end of the rear pair of tubes 52. At the front end of the front tubes 52, a front cross-tube 54 extends perpendicular to the tubes 52 for structurally connecting the front ends of the front pair of tubes 52. A pair of first connector tubes 56 are fixedly attached to the front cross-tube 54, wherein the first connector tubes 56 extend forwardly from the front cross-tube 54. A connector bracket 60 is attached to the longitudinally forward end of the pair of first connector tubes 56 (FIG. 3A), wherein the connector bracket 60 is oriented substantially perpendicular to the first connector tubes 56. The connector bracket 60 includes at least one aperture which provides a first rotatable connection 62 between the base 40 of the seat assembly 12 and the frame 14 of the vehicle 10. In an embodiment, the aperture formed in the connector bracket 60 receives a bearing to provide smooth rotation of the seat assembly 12 relative to the frame 14.

Figure 3A:
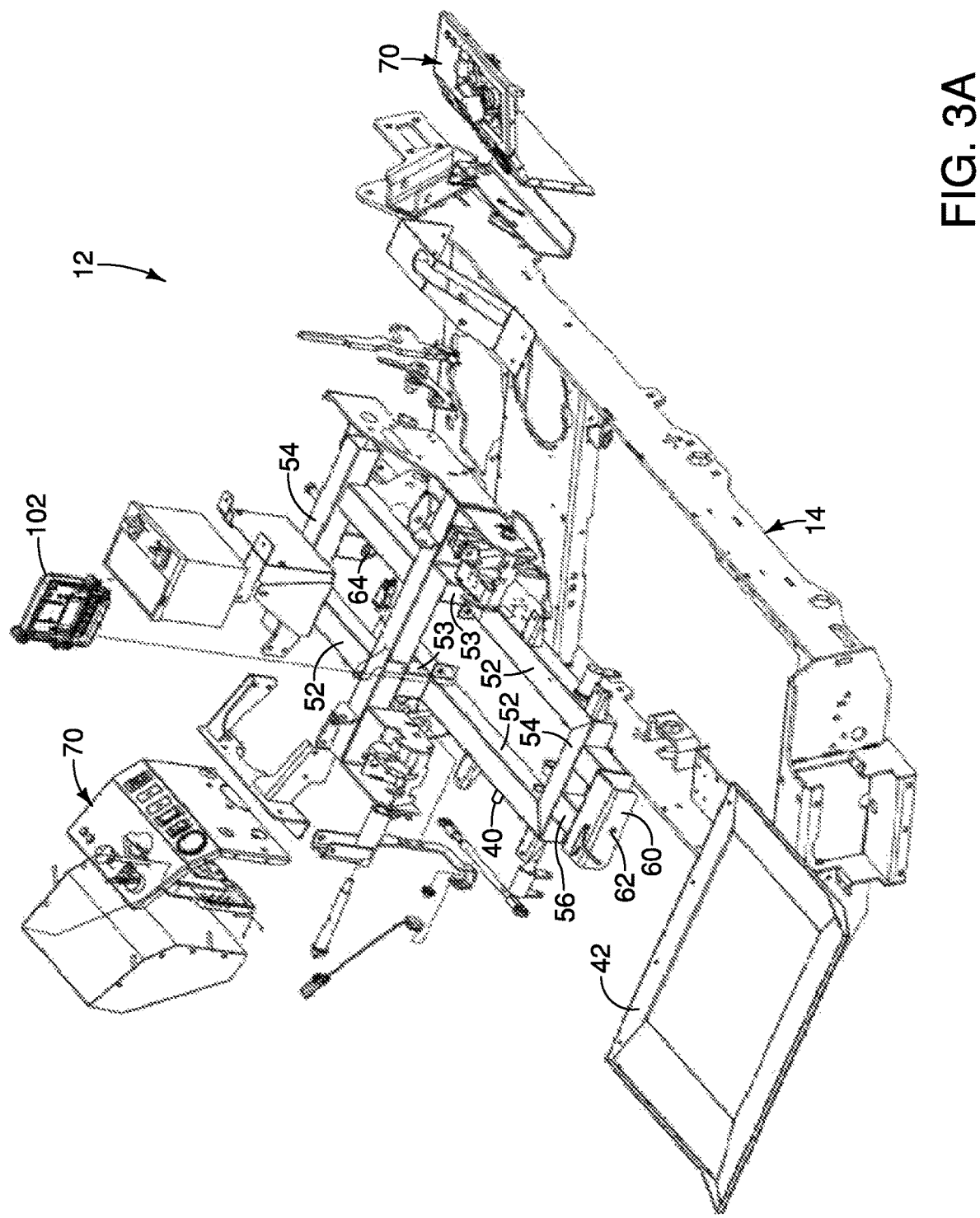
FIG. 3A is a top perspective exploded view of the seat assembly shown in FIG. 2A.
Figure 3B:
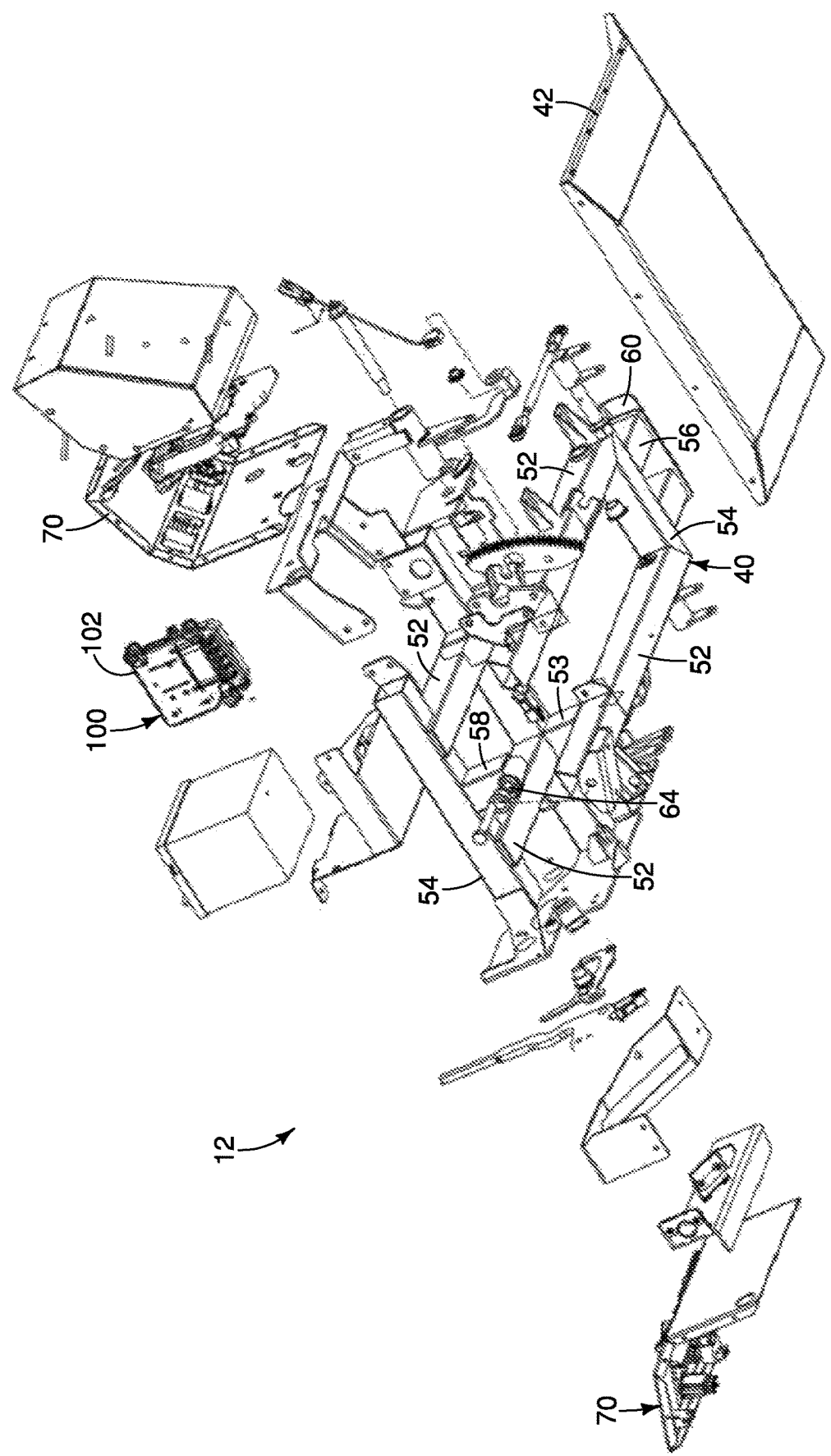
FIG. 3B is a bottom perspective exploded view of the seat assembly shown in FIG. 2A.
Figure 4:
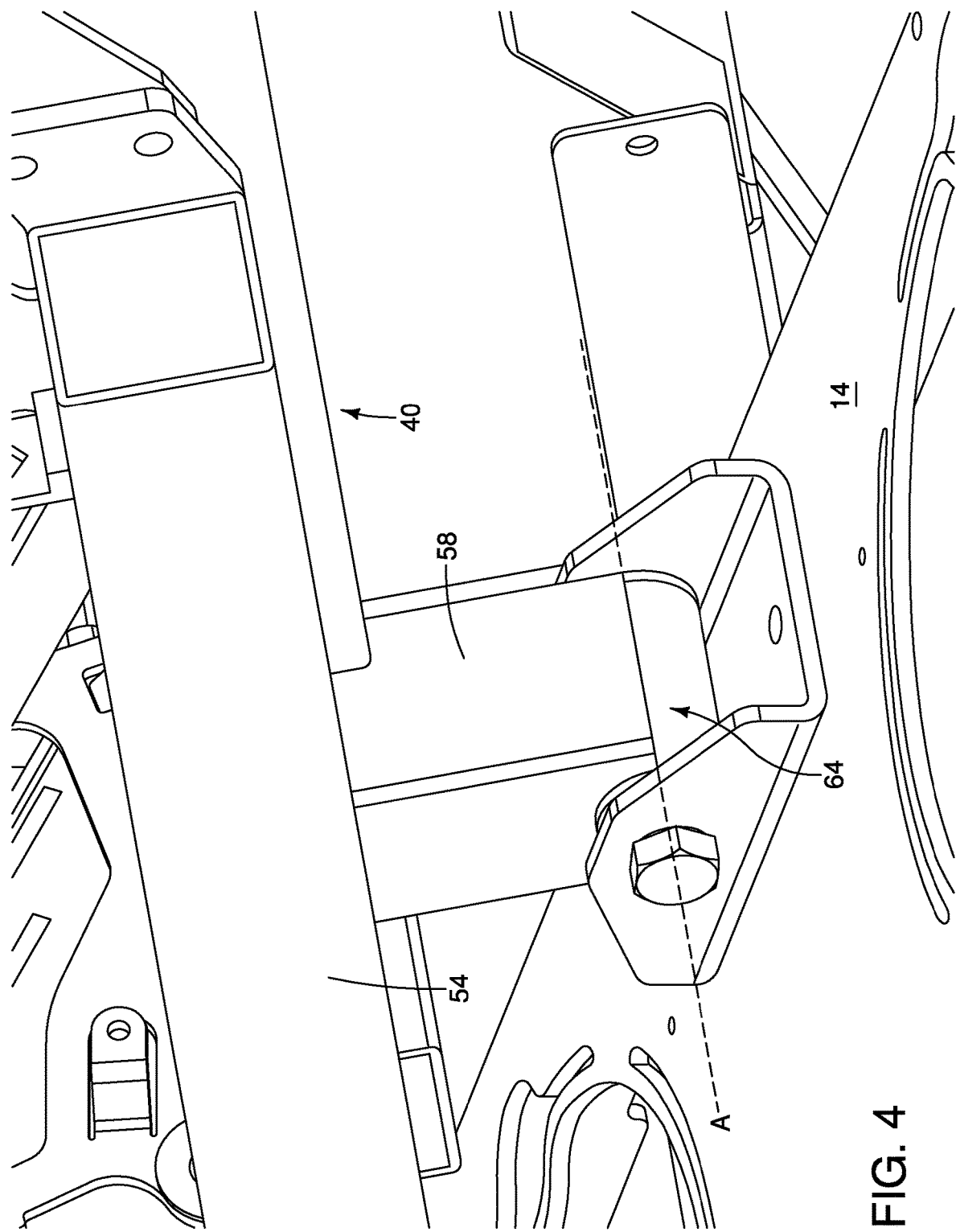
FIG. 4 is a magnified view of the rear rotatable connection between the seat assembly and the frame.
Figure 5:
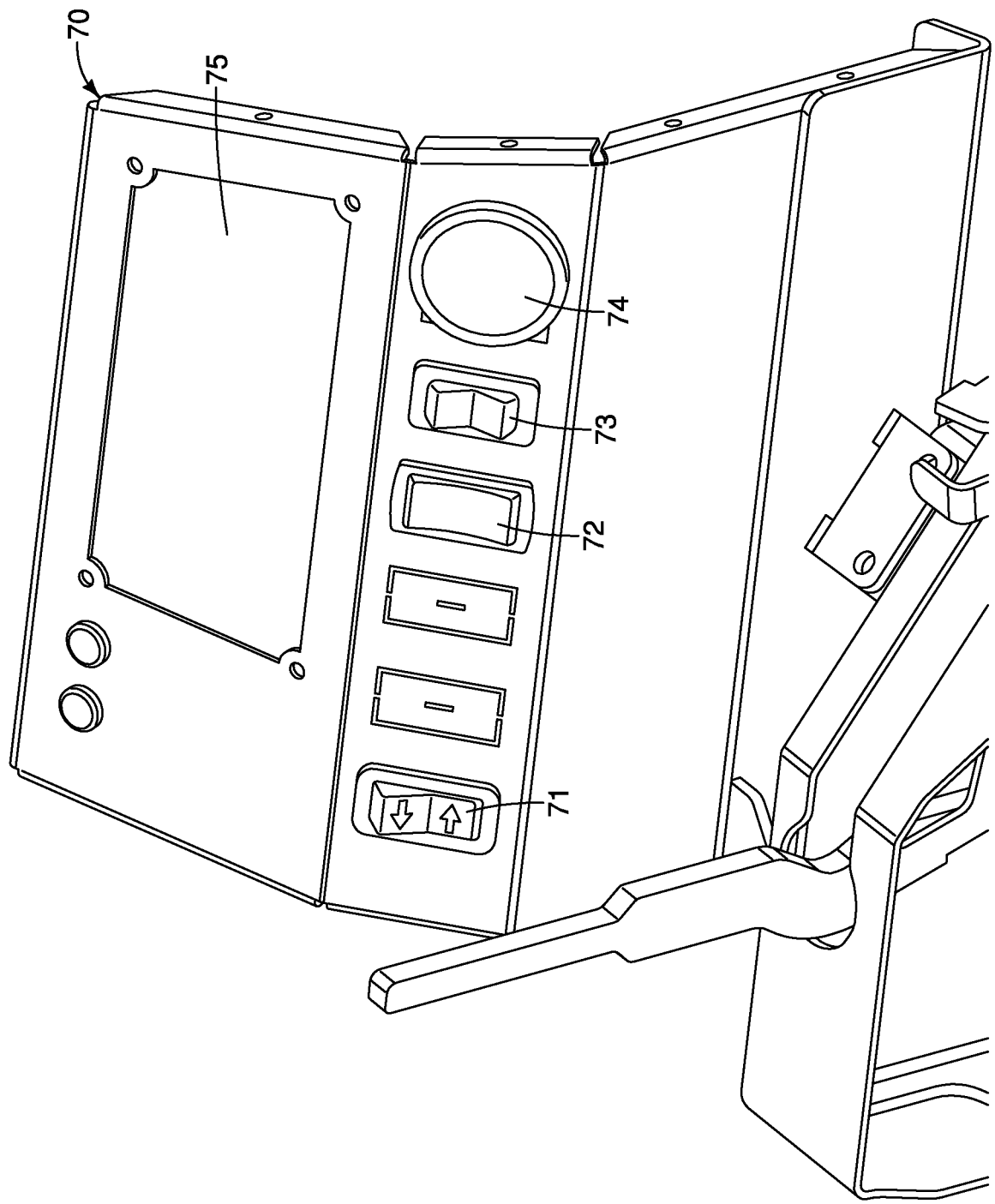
FIG. 5 is an exemplary embodiment of an operator control panel.

As shown in FIG. 3B, at the rear of the base 40, a rear cross-tube 54 extends substantially perpendicular between the rear ends of the rear pair of tubes 52. A second connector tube 58 extends vertically downward from the rear cross-tube 54. As shown in FIG. 4, the second connector tube 58 provides a second rotatable connection 64 between the base 40 and the frame 14 of the vehicle 10. The second connector tube 58 is configured to receive a bearing to provide smooth rotation between the seat assembly 12 and the frame 14. The base 40 of the seat assembly is rotatable relative to the frame 14 at the first and second rotatable connections 62, 64. The first and second rotatable connections 62, 64 are longitudinally aligned to form the axis of rotation A of the seat assembly 12. It should be understood by one having ordinary skill in the art that the base 40 can be formed of any number and arrangement of supporting structural tubes, beams, bars, or other components to provide a frame or matrix for the seat assembly 12.

Figure 2A:
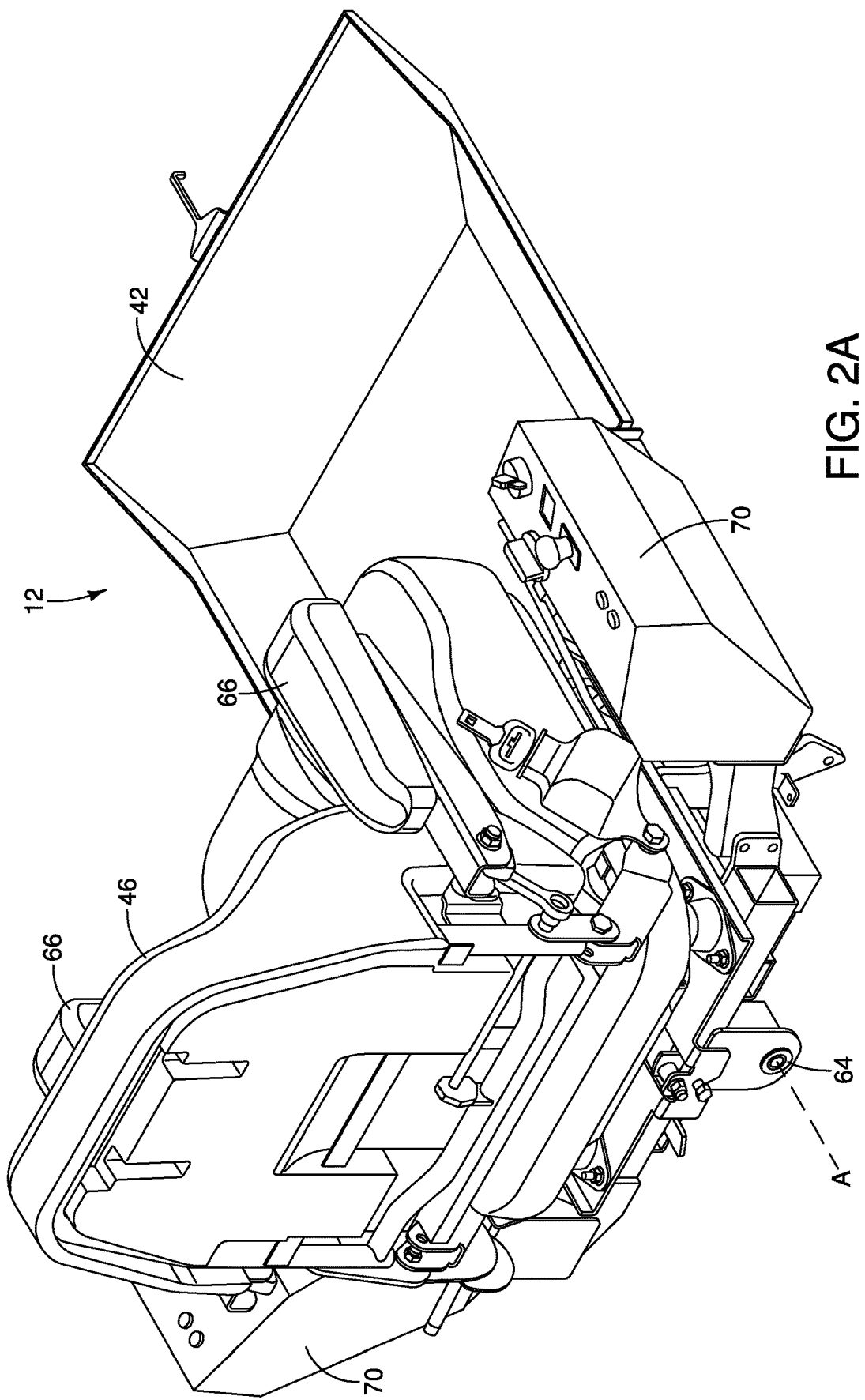
FIG. 2A is a perspective view of an embodiment of a seat assembly.
Figure 2B:
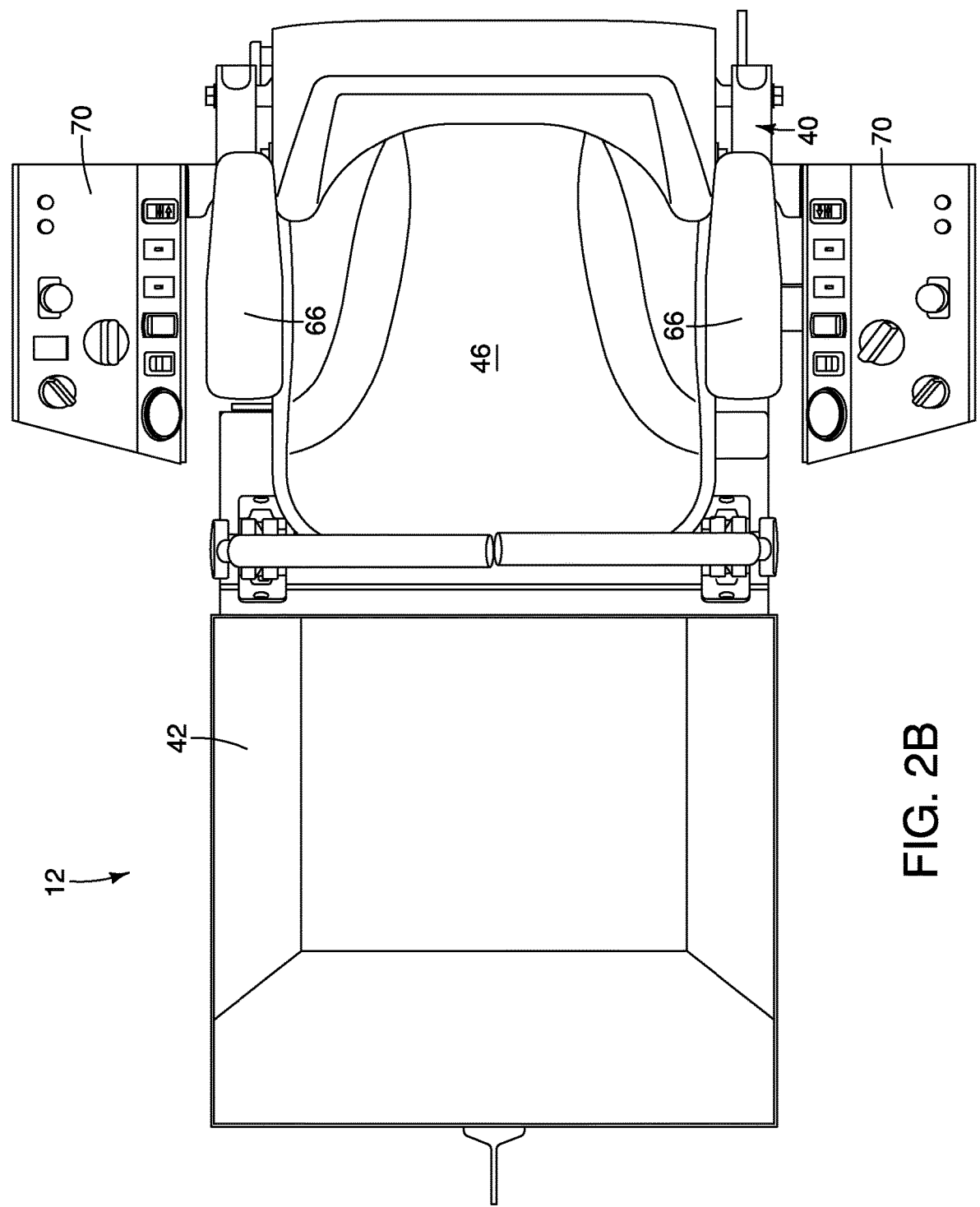
FIG. 2B is a top view of the seat assembly shown in FIG. 2A.
Figure 2C:
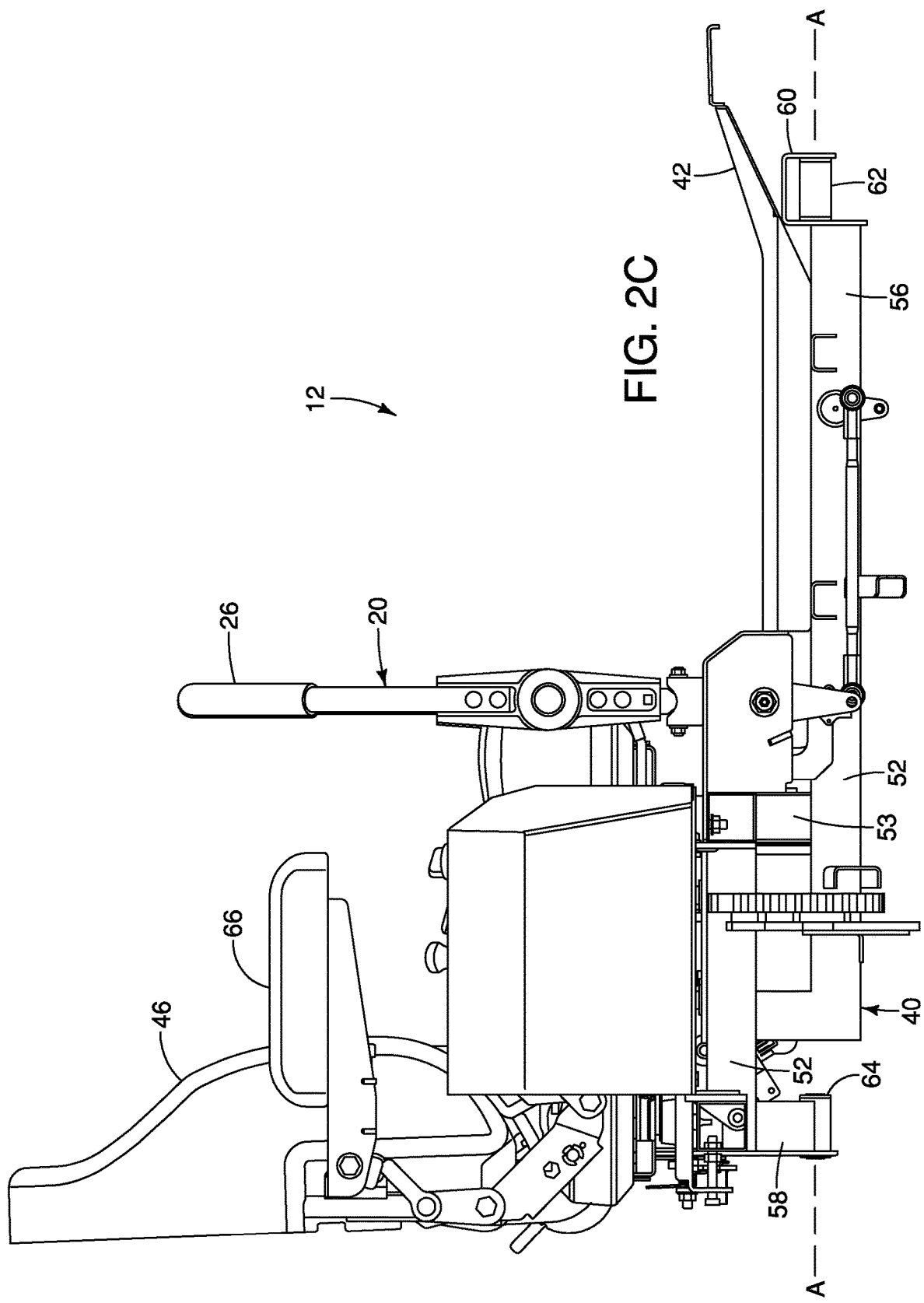
FIG. 2C is a side view of the seat assembly shown in FIG. 2A.

In the embodiment shown in FIGS. 2A-2C, a platform 42 is attached to the front tubes 52 of the base 40. The platform 42 is configured to be positioned at the longitudinally forward end of the base 40 to provide a surface to support the operator's feet while the operator sits in the seat 46 vehicle 10. In an embodiment, the platform 42 is formed as a generally flat plate in which the lateral side edges and forward edge of the plate are angled upwardly relative to the horizontal-aligned central portion of the plate. In another embodiment, the platform 42 and the base 40 are formed together as a singular support structure for the seat assembly 12. The platform 42 is positioned longitudinally forward of the seat 46.

In an embodiment, the seat 46 is configured to support an operator in a seated position on the vehicle 10, as shown in FIGS. 2A-2C. The seat 46 provides for both back and leg support for the operator during operation of the vehicle 10. The height and fore/aft position of the seat 46 is adjustable relative to the steering assembly 20. In an embodiment, the back support portion of the seat 46 is adjustable relative to the leg support portion. In another embodiment, the seat 46 is air-cooled to provide a more comfortable operating experience. In the illustrated embodiment, the seat 46 includes a pair of opposing arm rests 66 on which the operator can rest their arms during operation. The arm rests 66 are rotatable relative to the back support portion of the seat 46 to provide for easier entry and exit to the seat 46 for an operator as well as allowing an operator to place the arm rests 66 in a non-functional position. In some embodiments, the seat 46 includes at least one damper (not shown) positioned between the seat 46 and the base 40 to provide shock absorption between the seat 46 and the base 40.

FIGS. 3A-3B illustrate an embodiment of a seat assembly 12 having a single longitudinal axis A in which the seat assembly 12 is rotatable about the longitudinal axis A. In other embodiments, the seat 46 is attached to the base 40 or frame 14 by way of a plurality of gimbals to allow the seat 46 to rotate about two axes relative to the base 40 or frame 14. In further embodiments, the seat assembly 12 includes three or four linear actuators (not shown) attached thereto for adjusting the seat assembly 12 in response to forces applied to thereto during a zero-turn or tight-turn maneuver or driving the vehicle 10 on a sloped surface.

In the embodiment illustrated in FIGS. 2A-2D and 5, the seat assembly 12 also includes a pair of operator control panels 70 operatively connected to the base 40, wherein each operator control panel 70 is positioned adjacent to one of the lateral sides of the seat 46. Each operator control panels 70 allows the operator control various components and operations of the vehicle 10, wherein a plurality of switches, knobs, or other operator-controlled adjustment mechanisms are positioned within reach of the operator on each operator control panel 70. In one embodiment, an ignition switch (not shown) is located on one of the operator control panels 70 to allow the operator to turn the vehicle 10 on and off. One of the operator control panels 70 also includes a first switch 71 to change the mode of the vehicle 10 between a mowing mode and a non-mowing mode, wherein at least one cutting blade is rotatably engaged when the switch is moved to the mowing mode position. In another embodiment, one of the operator control panels 70 includes a second switch 72 that allows an operator to switch the seat assembly 12 between a self-adjusting mode and a manual-adjusting mode. In a further embodiment, one of the operator control panels 70 includes a third switch 73 that is configured to allow the operator to manually switch the lateral tilt angle of the seat assembly 12 relative to the frame 14. The operator control panel 70 also includes a lift knob 74 configured to allow an operator to adjust the height of the cutting deck 28. The lift knob 74 is rotatable, wherein rotation of the lift knob 74 in one direction causes the cutting deck 28 to be raised, and rotation of the lift knob 74 in the opposite direction causes the cutting deck 28 to be lowered. It should be understood by one having ordinary skill in the art that the switches or knob can be replaced with another control mechanism that can provide the same functional result. In some embodiments, the operator control panel 70 includes a display panel 75 that provides a user interface. The display panel 75 provides visual information such as height of the cutting deck 28, remaining fuel or battery supply, troubleshooting guidance, angle of orientation of the seat assembly 12, as well as other information. In an embodiment, the display panel 75 is an e-ink display, but it should be understood by one having ordinary skill in the art that the display panel 75 can be formed as an LCD display, LED display, or other similar type of display.

Figure 6B:
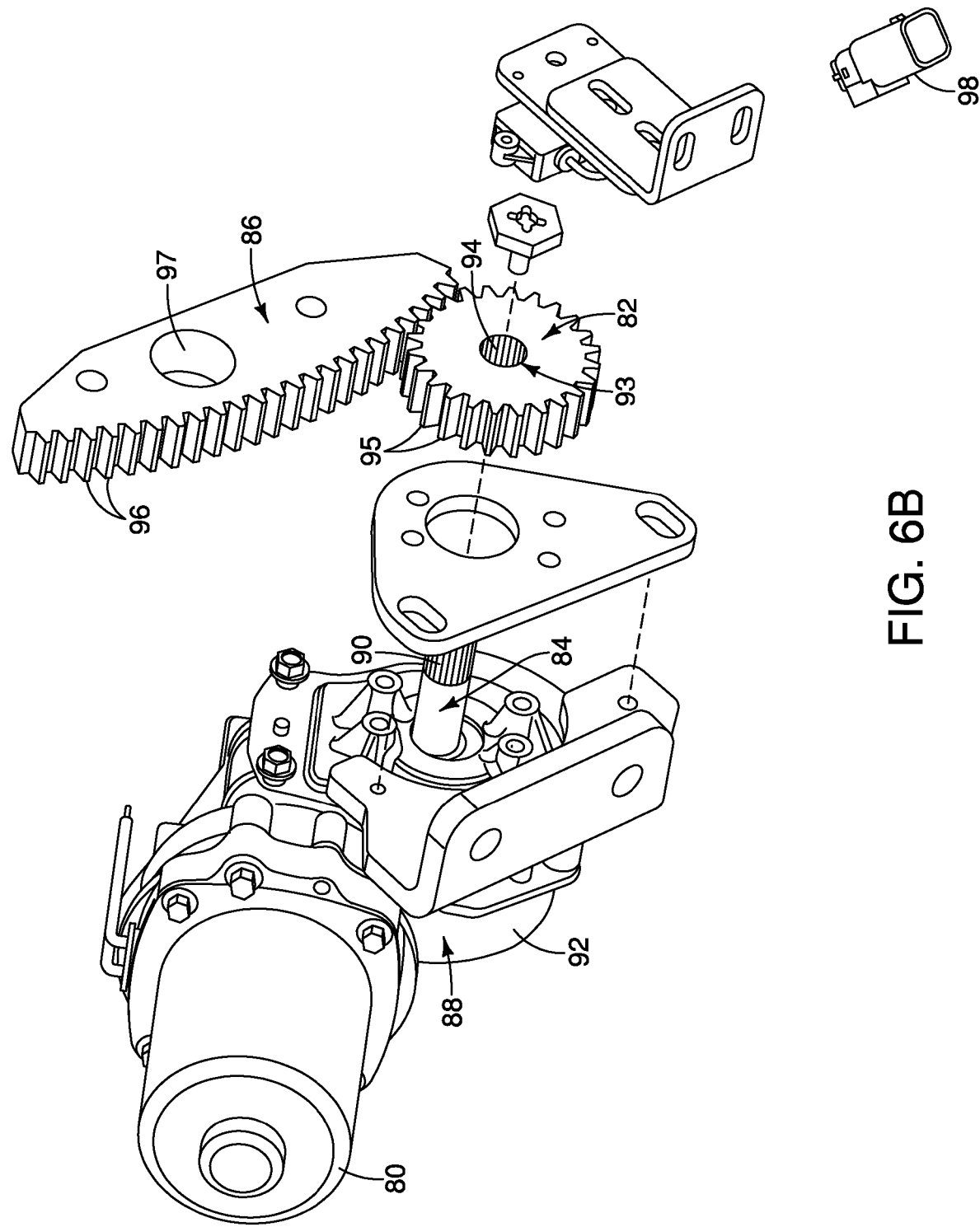
FIG. 6B is an exploded view of the adjustment mechanism shown in FIG. 6A.

An exemplary embodiment of an adjustment mechanism 44 is attached to the frame 14 and the seat assembly 12 for rotating the seat assembly 12 relative to the frame 14 while driving the vehicle 10 on a sloped surface or during a zero-turn or tight-turn maneuver, is shown in FIGS. 3B and 6A-6B. In the illustrated embodiment, the adjustment mechanism 44 includes an electric motor 80, a first spur gear 82, and a second spur gear 86. In some embodiments, the adjustment mechanism 44 further includes a transfer assembly 88 that receives rotational output from the motor 80 and changes the output rotational speed and torque which is transferred to the first spur gear 82. The adjustment mechanism 44 is configured to control the rotation of the seat assembly 12 relative to the frame 14. In some embodiments, the adjustment mechanism 44 causes rotation of the seat assembly 12 relative to the frame 14 in response to the vehicle 10 being operated on a sloped surface such as a hill, embankment, culvert, or the like and/or in response to zero-turn or tight-turn maneuvers. In other embodiments, the adjustment mechanism 44 can additionally be configured to cause the rotation of the seat assembly 12 relative to the frame 14 in response to a manual adjustment by an operator.

Figure 6C:
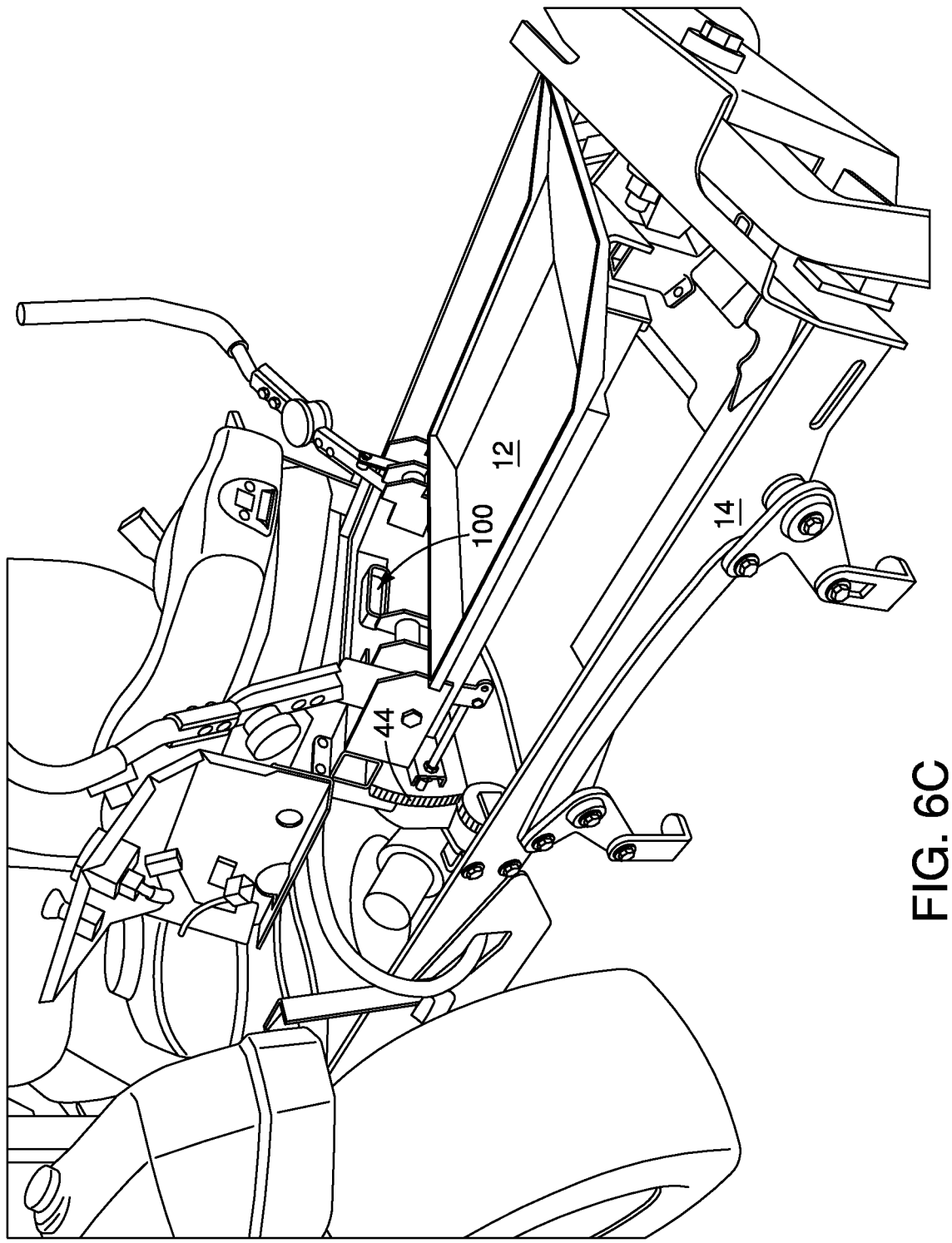
FIG. 6C is a perspective view of the vehicle having a rotated seat assembly.

As shown in FIGS. 6A-6C, the illustrated embodiment of the adjustment mechanism 44 is formed as a motor 80 with driven gears (first and second spur gears 82, 86). In other embodiments, the adjustment mechanism 44 includes a plurality of linear actuators (not shown) to similarly adjust the seat assembly 12 relative to the frame. In further embodiments, the adjustment mechanism 44 utilizes hydraulic actuators to adjust the seat assembly 12 relative to the frame 14. In still other embodiments, the adjustment mechanism 44 includes pneumatic actuators to adjust the seat assembly 12 relative to the frame 14.

In an embodiment, the motor 80 of the adjustment mechanism 44 is electrically-powered, wherein the motor 80 provides a rotational output. The motor 80 is secured to the frame 14, as shown in FIG. 6C, but it should be understood by one having ordinary skill in the art that the motor 80 can be attached to the base 40 of the seat assembly 12 such that the components are oriented opposite as they are shown in FIGS. 6A-6C. In the illustrated embodiment, the rotational output from the motor 80 is transferred to the transfer assembly 82. The transfer assembly 82 transfers the rotational output from the motor 80 to a drive shaft 84. The drive shaft 84 then provides the output rotational speed and torque from the transfer assembly to the first spur gear 82. It should be understood by one having ordinary skill in the art that in other embodiments the motor 80 transfers a rotational output directly to the drive shaft 84. The transfer assembly 82 includes a plurality of enmeshed gears to provide a gear reduction to increase the torque of the output rotation of the transfer assembly 82.

Figure 7:
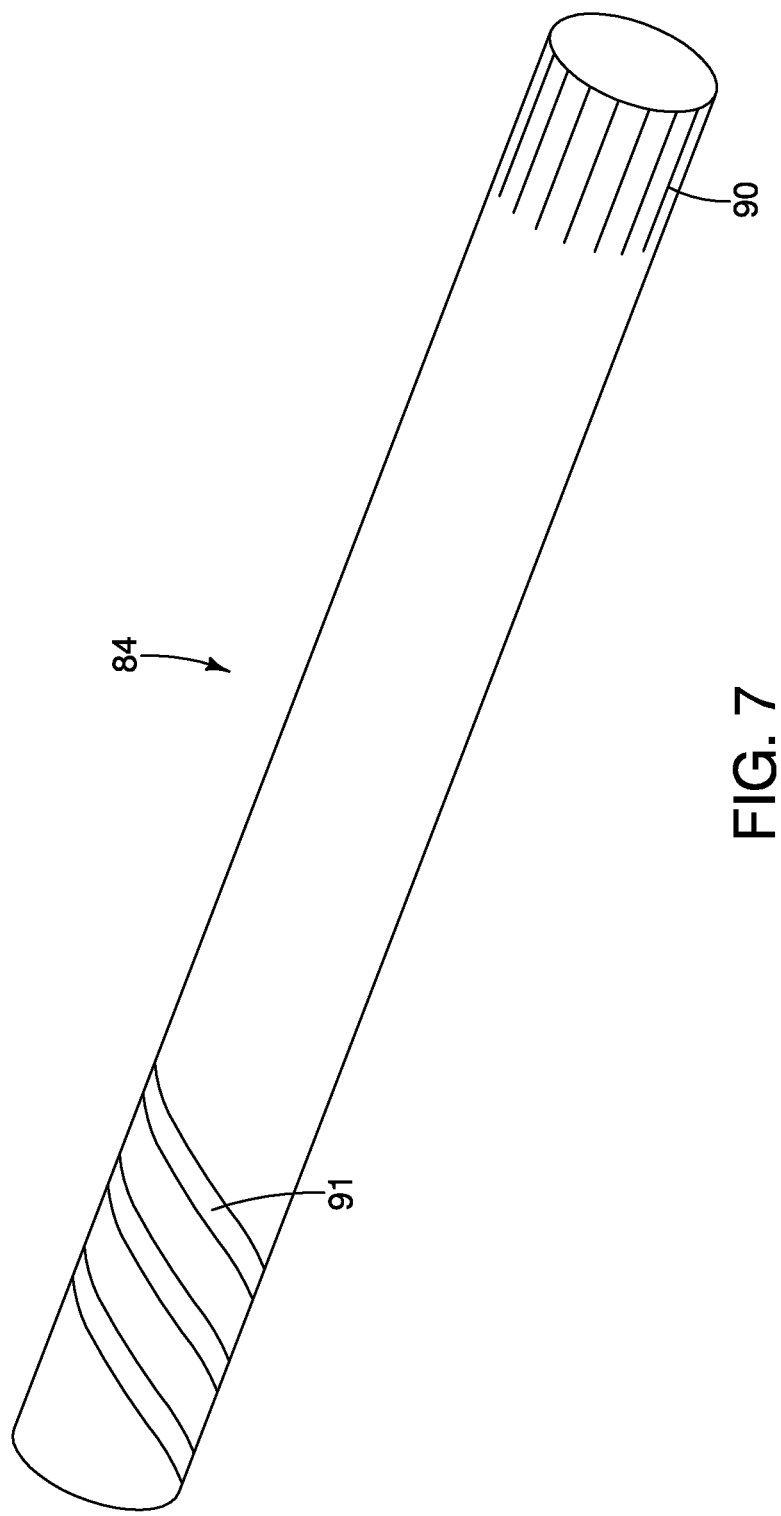
FIG. 7 is an exemplary embodiment of a drive shaft of an adjustment mechanism.

In an embodiment, the transfer assembly 82 includes a drive shaft 84 that extends from a housing 94, as shown in FIG. 6B. The drive shaft 84 is an elongated, generally cylindrical member. As shown in FIG. 7, the drive shaft 84 has a first distal end having splines 90 formed into the outer surface thereof. The second, opposing distal end of the drive shaft 84 includes a worm gear 91 formed into the outer surface thereof. The worm gear 91 of the drive shaft 84 meshes with a corresponding worm gear (not shown) within the transfer assembly 82 or the output shaft of the motor 80, wherein the meshing engagement of the worm gear 91 is configured to resist back drive. Back drive is unintended reverse rotation of the seat assembly 12 due to the weight of the operator—and thus the corresponding first and second spur gears 82, 85—when the power of the vehicle 10 is turned off.

The first spur gear 82 is attached to the first distal end of the drive shaft 84, as shown in FIGS. 6A-6B. The first spur gear 82 is a generally cylindrical member having a central aperture 93 formed through the thickness thereof. The surface defining the central aperture 93 is formed of a plurality of splines 94 that are configured to mesh and engage the corresponding splines 90 of the drive shaft 84. The first spur gear 82 is mounted onto the first distal end of the drive shaft 84 such that the central aperture 93 of the first spur gear 82 receives the first distal end of the drive shaft 84. The first spur gear 82 includes a plurality of teeth 95 extending radially outward. The teeth 95 of the first spur gear 82 are configured to mesh with the corresponding teeth 96 of the second spur gear 86. The first spur gear 82 is rotatably driven by the motor 80, and the second spur gear 86 is selectively driven by the first spur gear 82. The motor 80 is operatively connected to the first spur gear 82, and the motor 80 is configured to selectively rotate the first spur gear 82 in both the clockwise and counter-clockwise directions. Such rotation in both the clockwise and counter-clockwise directions of the first spur gear 82 results in the same clockwise and counter-clockwise rotation of the seat assembly 12 about the axis of rotation A through meshing engagement between the first spur gear 82 and the second spur gear 86.

As shown in FIGS. 6A-6B, the second spur gear 86 is attached to the base 40 of the seat assembly 12, and rotation of the second spur gear 86 causes the seat assembly 12 to rotate in a corresponding manner. The second spur gear 86 formed as an elongated gear having a curved rack that includes a plurality of teeth 96 that extend radially outward. The curved rack of the second spur gear 86 provides for limited lateral rotation of seat assembly 12 relative to the frame 14. In an embodiment, the arc length of the curved rack of the second spur gear 86 has a rotating range-of-motion of between about forty-five degrees (45°) in both the clockwise and counter-clockwise directions. In other embodiments, the rotating range-of-motion of the second spur gear 86 is about thirty degrees (30°) in both the clockwise and counter-clockwise directions. It should be understood by one having ordinary skill in the art that the maximum rotating range-of-motion of the second spur gear 86 can be between about five degrees (5°) and fifty degrees (50°) in each direction. It should further be understood by one having ordinary skill in the art that the rotational limit of the second spur gear 86 should be less than the angle at which any of the ground engaging members 16 disengage from the ground. The curved rack of teeth 96 that mesh with the teeth 95 of the first spur gear 82 results in rotational motion of the first spur gear 82 being converted into an arcuate motion of the second spur gear 86. The arcuate motion of the second spur gear 86 causes rotation of the seat assembly 12 about the axis of rotation A. The second spur gear 86 further includes a receiving aperture 97 formed through the thickness thereof. The receiving aperture 97 is configured to allow a wire or linkage extending rearwardly from the steering assembly 20 to pass through the receiving aperture 97. The size and shape of the receiving aperture 97 is configured to prevent any rubbing or other contact with the wire or linkage passing therethrough, regardless of the relative rotated position of the second spur gear 86.

Figure 9:
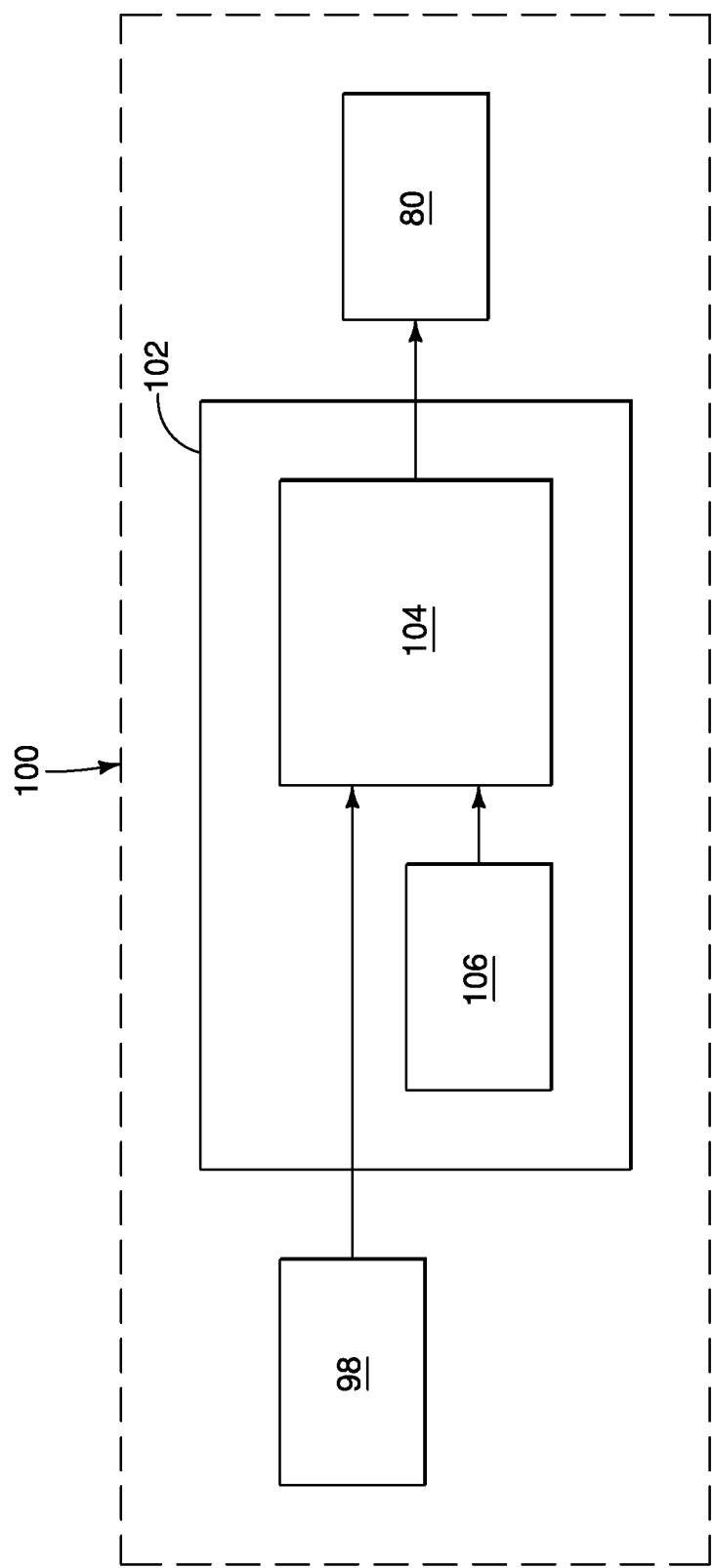
FIG. 9 is a schematic diagram of a control assembly.

The seat assembly 12 is adjustable relative to the frame 14 of the vehicle 10, and a control assembly 100 is configured to determine and control the relative position of the seat assembly 12 relative to the frame 14. In an embodiment, the control assembly 100 includes a housing 102 operatively connected to the seat 46, wherein the housing 102 is located just below the operator, as shown in FIGS. 2D, 3A-3B, and 6C. The control assembly 100 is mounting below the operator so that the control assembly 100 senses the same operating conditions as the operator. It should be understood by one having ordinary skill in the art that the control assembly 100 can also be located at a position spaced apart from the operator and the seat 46. The control assembly 100 further includes a position sensor 98, a processor 104, and a sensor array 106, as shown in FIG. 9. The processor 104 is configured to a first output signal from the position sensor 98 and a second output signal from the sensor array 106, wherein the first and second output signals represent measured variables of the vehicle 10 during operation. The processor 104 is configured to further generate a third output signal to the motor 80, wherein the third output signal controls the output rotational velocity and rotational direction of the motor 80, as will be explained in more detail below.

In an embodiment, the position sensor 98 is configured to measure the relative position of the first spur gear 82, as shown in FIGS. 6A-6B. In some embodiments, the position sensor 98 is formed as a Hall effect sensor. In other embodiments, the position sensor 98 is formed as a limit switch that is activated when the first spur gear 82 or second spur gear 86 is rotated to the maximum intended rotational angle relative to the home position, wherein the home position is the position of the first and second spur gears 82, 86 when the seat assembly 12 is oriented parallel to a horizontal plane. Although FIGS. 6A-6B illustrate a single position sensor 98 sensing the relative movement of the first spur gear 82, it should be understood by one having ordinary skill in the art that the position sensor 98 can be formed of any number of separate sensors configured to measure the relative rotation of the first and/or second spur gear(s) 82, 86. The position sensor 98 is configured to transmit a first output signal to the processor 104, wherein the first output signal corresponds to the measured position of the first and/or second spur gear(s) 82, 86.

The control assembly 100 further includes a sensor array 106 that is electrically and operatively connected to the processor 104, as shown in the schematic diagram in FIG. 9. The sensor array 106 is configured to generate a second output signal that is transmitted to the processor 104. In an embodiment, the sensor array 106 is located within the housing 102 positioned below the seat 46. It should be understood by one having ordinary skill in the art that the entire sensor array 106, or a portion thereof, may be positioned in a spaced-apart manner relative to the seat 46. The sensor array 106 is configured to measure various parameters sensed by the operator during operation of the vehicle 10 in real-time. In an exemplary embodiment, the sensor array 106 includes a gyroscope as well as three (3) accelerometers. Each accelerometer is configured to measure the acceleration in one of the three axes (vertical, fore/aft, or lateral), and the gyroscope is configured to measure the relative position of the seat assembly 12 relative to a horizontal plane or the relative angle or orientation of the operator relative to a vertical axis. In other embodiments, the sensor array 106 can include other measuring sensors such as a liquid level switch, a pendulum, an optical gyroscope, a piezoelectric sensor, or a plurality of altitude sensors (located at each corner of the seat assembly). The sensor array 106 can include any number and combination of sensing devices in order to effectively determine whether the vehicle 10 is on a sloped surface or is experiencing a zero-turn or tight-turn maneuver. The sensor array 106 provides a second output signal to the processor 104 which represents the current orientation of the seat assembly 12 relative to a horizontal plane as well as the accelerations in each of the three-dimensions that the operator is currently experiencing.

The processor 104 receives the first and second output signals, determines whether the seat assembly 12 requires adjustment, and if so, the processor 104 generates a third output signal to the motor 80 to rotate the seat assembly 12 in response to the current conditions measure by the sensor array 106. When the processor 104 determines that the vehicle 10 is on a sloped surface, the processor 104 determines the relative angle of the sloped surface, and the third output signal to the motor 80 is configured to rotate the seat assembly 12 until the seat assembly—and as a result, the operator—is oriented in a substantially vertical orientation. The processor 104 also determines when the vehicle 10 is in a zero-turn or tight-turn maneuver in which the operator tends to lean radially outward from the central axis of the turn, or otherwise causes the operator to feel is if they are being pushed off the seat 46 away from the central axis of the turn. When the processor 104 determines the vehicle 10 is in a zero-turn or tight-turn maneuver, the processor 104 transmits a third output signal to the motor 80 in which the motor 80 causes the seat assembly 12 to be tilted toward the central axis of the turn. Banking or otherwise rotating the seat assembly 12 toward the central axis of the turn reduces or otherwise offsets the centrifugal forces acting on the operator during the maneuver, thereby stabilizing the user during operation of the vehicle 10.

Figure 8A:
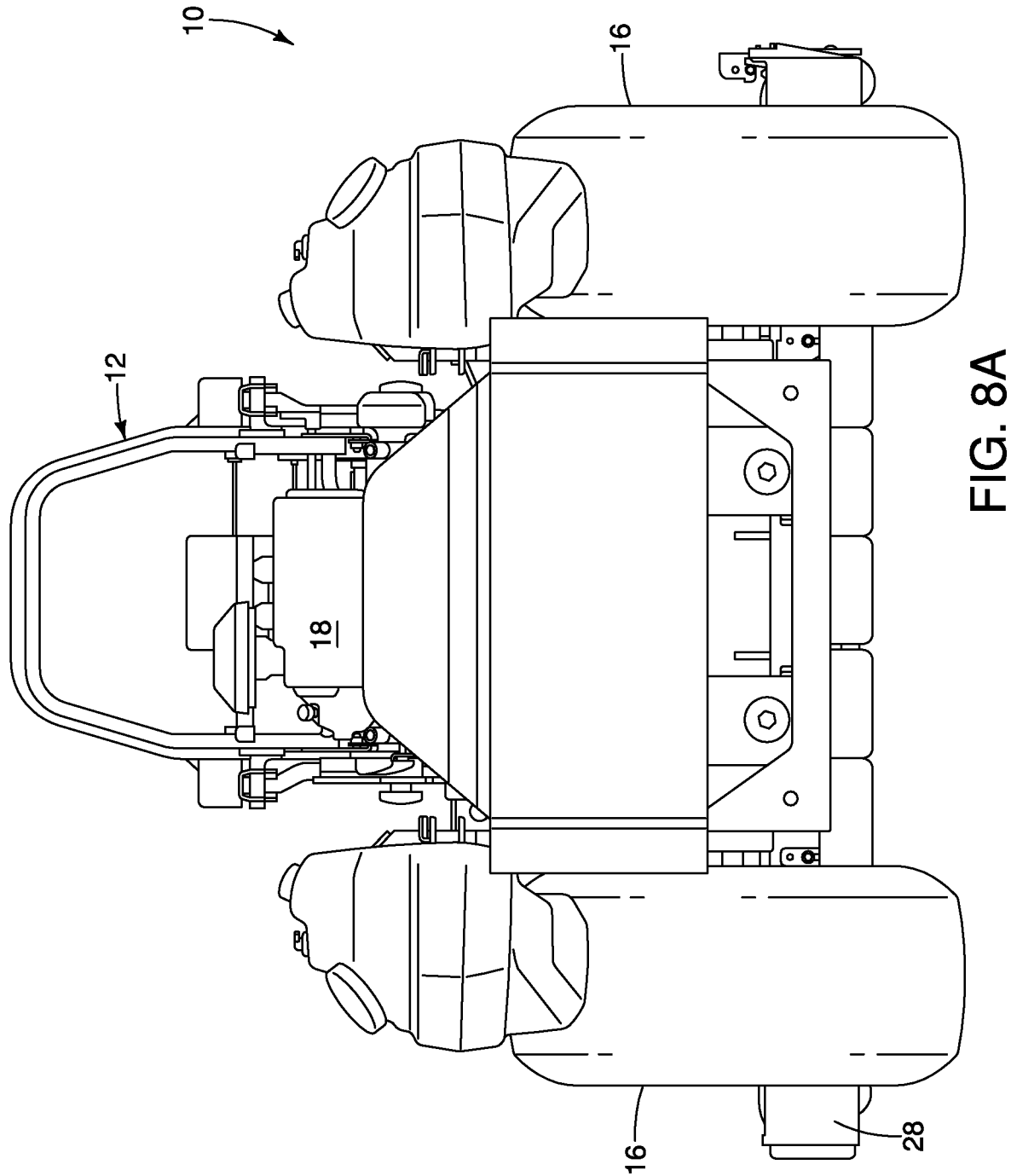
FIG. 8A is a vehicle on flat ground.

In operation, when the vehicle 10 is operated on substantially horizontal ground, as shown in FIG. 8A, the processor 104 causes the motor 80 maintains the seat assembly 12 in a first operative position, or home position in which the base 40 of the seat assembly 12 is oriented substantially parallel to a horizontal plane and the operator is oriented in a substantially vertical alignment. The processor 104 receives continuous feedback measurements from the position sensor 98 as well as the sensor array 106 to ensure the seat assembly 12 is maintained in the home position so long as the vehicle 10 is being on ground that is substantially horizontal.

Figure 8B:
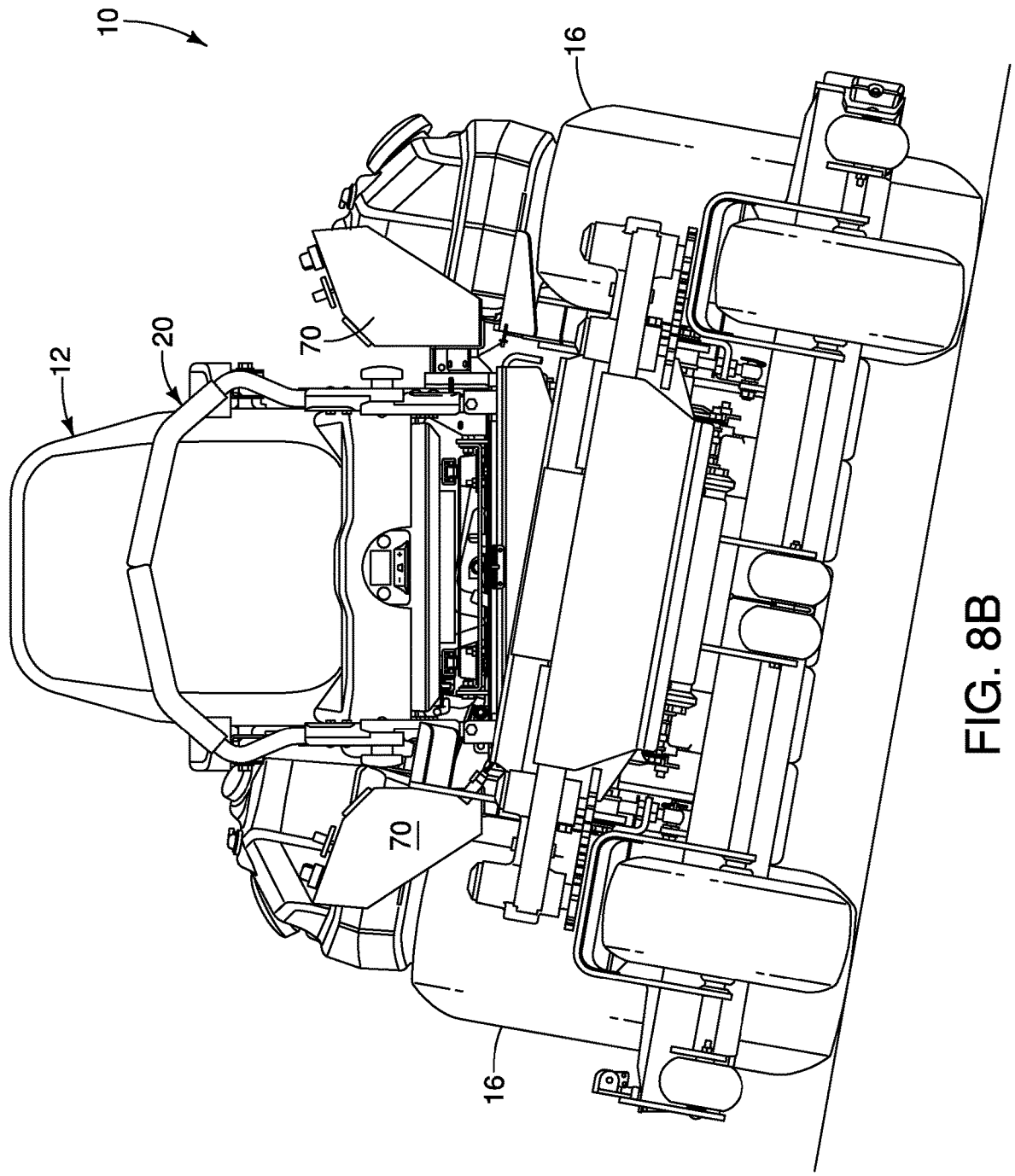
FIG. 8B is a vehicle on a sloped surface.

When the vehicle 10 is operated on a sloped surface, as shown in FIG. 8B, the seat assembly 12 is adjusted such that the frame is oriented substantially parallel to a horizontal plane and the operator is seated in a substantially vertical alignment. In an embodiment, the sensor array 106 provides measurements to the processor 104 to indicate the angle of slope of the ground. When the angle of slope of the ground is determined, the processor 104 controls the motor 80 to rotate the seat assembly 12 until the measured position of the first spur gear 82 by the position sensor 98 is processed and determined to be the same angle (in the opposing lateral direction) as the slope of the ground. In another embodiment, the relative slope of the ground is not measured by the sensor array 106 or determined by the processor 104. Instead, the sensor array 106 provides measurements to the processor 104 such that the processor 104 determines whether or not the seat assembly 12 is oriented substantially parallel to a horizontal plane. The seat assembly 12 is rotated relative to the frame 14 operating on a sloped surface to stabilize the operator by maintaining the operator in a generally vertical seated alignment regardless of the sloped angle of the ground. In some embodiments, the steering assembly 20 is rotated along with the seat assembly 12 such that the operator can maintain control of the vehicle 10 when the seat assembly 12 is rotated relative to the frame 14.

The processor 106 also receives current operating conditions by the sensor array 106 to determine when the vehicle is in a zero-turn or tight-turn maneuver. When the processor 106 determines such a maneuver is occurring, the processor transmits a third output signal to the motor 80 to cause the seat assembly 12 to rotate toward the center of rotation of the turn. In an embodiment, during a zero-turn or tight-turn maneuver, the processor 106 causes the motor 80 to rotate the seat assembly 12 a pre-determined amount or angle regardless of the vehicle 10 speed or radius of the turn—or the magnitude of the centrifugal forces experienced by the operator. In another embodiment, during a zero-turn or tight-turn maneuver, the processor 106 causes the motor 80 to rotate the seat assembly 12 to an angle of rotation that is dependent upon the speed of the vehicle 10 as well as the centrifugal forces determined by the relative accelerations in each direction. As such, for tighter turns at higher speeds, the seat assembly 12 is rotated a greater angle toward the center of rotation of the turn than the angle that the seat assembly 12 is rotated for turns at lower speeds and/or less-tight turns. The angle of rotation of the seat assembly 12 during a zero-turn or tight-turn maneuver is optimized to reduce or otherwise offset the centrifugal forces experienced by the operator during such turning maneuvers.

Regardless of the angle at which the seat assembly 12 is positioned when the vehicle 10 is turned off or otherwise powered down, the processor 106 causes the motor 80 to rotate the seat assembly 12 to the home position in response to the vehicle 10 being powered down. This allows the operator to easily exit and re-enter the seat 46.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A lawn maintenance vehicle having a frame, a plurality of ground engaging members, and a power source for selectively driving at least one of said ground engaging members, said lawn maintenance vehicle comprising:
 a platform operatively connected to said frame for supporting an operator;
 a pair of control levers selectively controlling said at least one driven ground engaging member;
 a seat assembly operatively connected to said frame for supporting an operator, wherein orientation of said platform relative to said frame is adjustable;
 a sensor array for measuring at least one operating condition, said sensor array providing output data in response to said at least one operating condition;
 a controller continually receiving said output data from said sensor array, said controller calculating at least one of a first driving condition and a second driving condition, wherein calculating said first driving condition is determining when said frame is traversing a non-horizontal surface; and
 an adjustment mechanism operatively connected to said controller and said platform;
 wherein said controller causes said adjustment mechanism to rotate said platform relative to said frame in response to at least one of said first driving condition and said second driving condition, and
 wherein said controller causes said adjustment mechanism to adjust said platform to a substantially horizontal orientation when said frame is traversing the non-horizontal surface.

2. The lawn maintenance vehicle of claim 1, wherein said plurality of ground engaging members includes two driven ground engaging members connected near a rear of said frame and controlled by said control levers and two ground engaging members connected near a front of said frame.

3. The lawn maintenance vehicle of claim 1, wherein said pair of control levers are lap bars.

4. The lawn maintenance vehicle of claim 1, wherein said pair of control levers are hand grips movable in a fore-aft manner.

5. The lawn maintenance vehicle of claim 1 further comprising a seat attached to said platform for receiving said operator.

6. The lawn maintenance vehicle of claim 1, wherein said operator stands on said platform.

7. The lawn maintenance vehicle of claim 1, wherein said sensor array includes a plurality of accelerometers and a plurality of gyroscopes.

8. The lawn maintenance vehicle of claim 1, wherein said sensor array includes a pendulum.

9. The lawn maintenance vehicle of claim 1, wherein said sensor array includes a liquid level switch.

10. The lawn maintenance vehicle of claim 1, wherein said sensor array includes an optical gyroscope.

11. The lawn maintenance vehicle of claim 1, wherein said sensor array includes a piezoelectric sensor.

12. The lawn maintenance vehicle of claim 1, wherein said sensor array includes an altitude sensor positioned adjacent to each of said plurality of ground engaging members.

13. The lawn maintenance vehicle of claim 1, wherein said controller causes said adjustment mechanism to adjust said platform relative to said frame to normalize forces on said operator relative to a longitudinal axis about which said platform is rotatable when said frame is traversing a non-horizontal surface.

14. The lawn maintenance vehicle of claim 1, wherein calculating said second driving condition is determining when a direction of said frame is being turned.

15. The lawn maintenance vehicle of claim 14, wherein said controller causes said adjustment mechanism to adjust said platform relative to said frame to normalize forces on said operator relative to a longitudinal axis about which said platform is rotatable when said direction of said frame is being turned.

16. The lawn maintenance vehicle of claim 1, wherein said platform is adjustable about a longitudinal axis relative to said frame.

17. The lawn maintenance vehicle of claim 1, wherein said platform is adjustable about two axes relative to said frame.

18. The lawn maintenance vehicle of claim 1, wherein said platform is adjustable in three axes relative to said frame.

19. The lawn maintenance vehicle of claim 1, wherein said adjustment mechanism includes a motor attached to said frame, said motor being operatively connected to said controller, and said motor selectively driving a first gear that is meshingly engaged with a second gear attached to said platform, and rotation of said first gear causes rotation of said second gear which causes said platform to rotate relative to said frame.

20. The lawn maintenance vehicle of claim 1, wherein said adjustment mechanism includes a plurality of linear actuators extending between said frame and said platform for rotating said platform relative to said frame in three dimensions.

21. The lawn maintenance vehicle of claim 1, wherein said adjustment mechanism includes at least one hydraulic actuator extending between said frame and said platform for rotating said platform relative to said frame.

22. The lawn maintenance vehicle of claim 1, wherein said adjustment mechanism includes at least one pneumatic actuator extending between said frame and said platform for rotating said platform relative to said frame.

23. The lawn maintenance vehicle of claim 1, wherein said adjustment mechanism includes three actuators, wherein each actuator selectively rotates said platform about a different axis relative to said platform.

24. The lawn maintenance vehicle of claim 1, wherein said platform is adjustable relative to said frame to normalize forces on said operator relative to a longitudinal axis.

25. The lawn maintenance vehicle of claim 1, wherein said platform is adjustable relative to said frame to normalize forces on said operator in three dimensions.

26. A lawn maintenance vehicle having a frame, a plurality of ground engaging members, a power source for selectively driving at least one of said ground engaging members, and a pair of control levers selectively controlling said at least one driven ground engaging member, said lawn maintenance vehicle comprising:
   a platform operatively connected to said frame for supporting an operator, wherein said platform is adjustably rotatable about a longitudinal axis relative to said frame;
   an adjustment mechanism extending between said frame and said platform, wherein said adjustment mechanism adjusts an orientation of said platform relative to said frame;
   a plurality of measuring devices for measuring rotation and acceleration of said frame during operation, said plurality of measuring devices include at least one gyroscope and at least one accelerometer, wherein each of said measuring devices generates output data;
   a controller for receiving said output data from each of said plurality of measuring devices, said controller simultaneously determining if a direction of said frame is turning and if said frame is traversing a non-horizontal surface;
   wherein said controller causes said adjustment mechanism to rotate said platform relative to said frame when at least one of said direction of said frame is turning and said frame is traversing a non-horizontal surface.

27. The lawn maintenance vehicle of claim 26, wherein said controller causes said adjustment mechanism to rotate said platform to a horizontal orientation relative to said frame when said frame is traversing a non-horizontal surface.

28. The lawn maintenance vehicle of claim 26, wherein said controller causes said adjustment mechanism to rotate said platform to an orientation relative to said frame in which said forces acting on said operator relative to said longitudinal axis are normalized when said frame is traversing a non-horizontal surface.

29. The lawn maintenance vehicle of claim 26, wherein said controller causes said adjustment mechanism to rotate said platform to an orientation relative to said frame in which a center of gravity of said operator continually remains directly above said longitudinal axis when said frame is traversing a non-horizontal surface.

30. The lawn maintenance vehicle of claim 26, wherein said controller causes said adjustment mechanism to rotate said platform to an orientation relative to said frame in which said forces acting on said operator relative to said longitudinal axis are normalized when said direction of said frame is turning.

31. The lawn maintenance vehicle of claim 26, wherein said controller causes said adjustment mechanism to rotate said platform relative to said frame in which said platform is rotated in a first direction that is opposite a direction that centrifugal forces act on said frame when said direction of said frame is turning.

32. A lawn maintenance vehicle having a frame, a plurality of ground engaging members, a power source for selectively driving at least one of said ground engaging members, and a pair of control levers selectively controlling said at least one driven ground engaging member, said lawn maintenance vehicle comprising:
   a platform operatively connected to said frame for supporting an operator, wherein said platform is adjustably rotatable about a longitudinal axis relative to said frame;
   an adjustment mechanism extending between said frame and said platform, wherein said adjustment mechanism adjusts said platform relative to said frame;
   a plurality of measuring devices for measuring rotation and acceleration of said frame during operation, said plurality of measuring devices include at least one gyroscope and at least one accelerometer, wherein each of said measuring devices generates output data;
   a controller for receiving said output data from each of said plurality of measuring devices, said controller simultaneously determining if a direction of said frame is turning and if said frame is traversing a non-horizontal surface;
   wherein when said controller determines said frame is traversing a non-horizontal surface, said controller causes said adjustment mechanism to rotate said platform until external forces on said operator relative to said longitudinal axis are normalized; or
   wherein when said controller determines said direction of said frame is turning, said controller causes said adjustment mechanism to rotate said platform until external forces on said operator relative to said longitudinal axis are normalized.

33. The lawn maintenance vehicle of claim 32, wherein said controller causes said platform to rotate when said frame is traversing a non-horizontal surface simultaneously when said direction of said frame is being turned such that said external forces on said operator relative to said longitudinal axis are normalized.

* * * * *